United States Patent
Guerin

(10) Patent No.: US 10,471,605 B2
(45) Date of Patent: Nov. 12, 2019

(54) PROGRAMMABLE ADAPTERS FOR DETACHABLY CONNECTING ROBOTIC PERIPHERALS TO ADAPTIVELY RETOOL ROBOTS

(71) Applicant: READY ROBOTICS, Baltimore, MD (US)

(72) Inventor: Kelleher Guerin, Baltimore, MD (US)

(73) Assignee: READY ROBOTICS, Baltimore, MD (US)

(*) Notice: Subject to any disclaimer, the term of this patent is extended or adjusted under 35 U.S.C. 154(b) by 74 days.

(21) Appl. No.: 15/498,305

(22) Filed: Apr. 26, 2017

(65) Prior Publication Data
US 2018/0311831 A1    Nov. 1, 2018

(51) Int. Cl.
| | | |
|---|---|---|
| G05B 15/00 | (2006.01) | |
| G05B 19/00 | (2006.01) | |
| B25J 15/04 | (2006.01) | |
| G05B 19/39 | (2006.01) | |

(52) U.S. Cl.
CPC ....... *B25J 15/0466* (2013.01); *B25J 15/0433* (2013.01); *B25J 15/0483* (2013.01); *G05B 19/39* (2013.01); *G05B 2219/39468* (2013.01); *G05B 2219/40302* (2013.01)

(58) Field of Classification Search
None
See application file for complete search history.

(56) References Cited

U.S. PATENT DOCUMENTS

| | | | | |
|---|---|---|---|---|
| 4,897,014 A * | 1/1990 | Tietze | ................. | B25J 15/0206 279/2.23 |
| 4,905,938 A * | 3/1990 | Braccio | ............... | F16L 37/1205 244/101 |
| 4,906,123 A * | 3/1990 | Weskamp | ............ | B23Q 1/0063 403/322.2 |
| 4,990,022 A * | 2/1991 | Watanabe | ................ | B25J 15/04 285/362 |
| 5,069,524 A * | 12/1991 | Watanabe | ................ | B25J 15/04 250/227.11 |
| 5,118,248 A * | 6/1992 | Brucher | ................... | B21J 13/10 294/206 |
| 5,156,481 A * | 10/1992 | Overbay | .................. | B25J 15/04 403/14 |
| 5,460,536 A * | 10/1995 | Cullen | ................. | B23K 11/364 439/289 |
| 5,624,364 A * | 4/1997 | Zimmer | ............... | B25J 15/0491 414/4 |
| 5,752,904 A * | 5/1998 | Irri | ....................... | B25J 15/0491 409/232 |
| 5,782,571 A * | 7/1998 | Hufford | ................... | B25J 15/04 403/288 |
| 5,993,365 A * | 11/1999 | Stagnitto | .............. | B25J 15/0491 414/736 |
| 6,225,589 B1 * | 5/2001 | Bartok | .................. | B23H 7/265 219/69.15 |

(Continued)

*Primary Examiner* — Bhavesh V Amin
(74) *Attorney, Agent, or Firm* — MH2 Technology Law Group LLP

(57) ABSTRACT

Apparatus and methods for adaptively retooling robots include programmable adapters for detachably connecting at least one robotic peripheral to a robot, providing peripheral information associated with the robotic peripheral, and causing the robot to adaptively reconfigure based on the peripheral information.

18 Claims, 7 Drawing Sheets

(56) References Cited

U.S. PATENT DOCUMENTS

| | | | |
|---|---|---|---|
| 6,769,830 B1* | 8/2004 | Nygren | B64G 1/641 |
| | | | 29/446 |
| 7,794,171 B2* | 9/2010 | Park | B25J 3/04 |
| | | | 403/349 |
| 9,144,909 B2* | 9/2015 | DeLouis | B25J 15/04 |
| 10,076,844 B2* | 9/2018 | Rizk | B25J 15/04 |
| 2007/0020065 A1* | 1/2007 | Kirby | B23Q 1/035 |
| | | | 414/1 |
| 2007/0228670 A1* | 10/2007 | Norton | B23B 31/1071 |
| | | | 279/2.11 |
| 2008/0132393 A1* | 6/2008 | Jordil | G01B 5/012 |
| | | | 483/58 |
| 2009/0044655 A1* | 2/2009 | DeLouis | B25J 15/04 |
| | | | 74/490.05 |
| 2009/0054909 A1* | 2/2009 | Farritor | A61B 17/00234 |
| | | | 606/130 |
| 2012/0207538 A1* | 8/2012 | Rizk | B25J 15/04 |
| | | | 403/315 |
| 2013/0238129 A1* | 9/2013 | Rose | F04B 9/10 |
| | | | 700/258 |
| 2013/0345718 A1* | 12/2013 | Crawford | A61B 17/025 |
| | | | 606/130 |
| 2016/0059423 A1* | 3/2016 | Pedersen | B25J 15/04 |
| | | | 74/490.05 |

\* cited by examiner

PROGRAMMABLE ADAPTERS FOR DETACHABLY CONNECTING ROBOTIC PERIPHERALS TO ADAPTIVELY RETOOL ROBOTS

FIELD

The present disclosure relates generally to programmable adapters for detachably connecting at least one robotic peripheral to a robot, providing peripheral information associated with the robotic peripheral, and causing the robot to adaptively reconfigure based on the peripheral information.

BACKGROUND

Industrial robotic automation has seen significant adoption in large-scale manufacturing for tasks such as welding, cutting, stamping, painting, heavy material handling, precision material machining, and the like. Robotic automation in manufacturing offers many benefits, such as higher productivity, lower production costs, better quality, greater consistency, and the like. However, robotic automation comes with a hefty price tag. Enterprises engaging in large-scale manufacturing can leverage scale of production to amortize high initial costs and overhead associated with robotic automation. Therefore, for large-scale manufacturing enterprises, benefits of robotic automation justify its hefty price tag.

Successful adoption of robotic automation in large-scale manufacturing has led to a long-standing desire for small and medium-sized manufacturing enterprises ("SMEs") to also significantly adopt robotic automation. However, SMEs typically engage in manufacturing processes at smaller scales, and thus SMEs are less able to leverage production scale to amortize high initial costs and overhead associated with robotic automation. Therefore, there is a need for apparatus and methods for overcoming these and other problems presented by the prior art.

SUMMARY

With robotic technology continuing to advance and becoming more accessible, SMEs are eager to join large-scale manufacturing enterprises in adopting and reaping the benefits of robotic automation. However, compared to large-scale manufacturing enterprises, SMEs typically implement production processes at smaller scales, and thus SMEs are less able to leverage production scale to amortize high initial costs and overhead associated with robotic automation. Moreover, production processes implemented by SMEs typically involve shorter production cycles, entail higher product variability, and/or demand quicker design-to-product turnaround. Consequently, SMEs need to attach, set up, and swap robotic peripherals more frequently than large-scale manufacturing enterprises, which present SMEs with several challenges. For example, how can robotic peripherals be attached to and swapped out of a robot in a robotic system rapidly and in a repeatable manner? How can the robotic system efficiently obtain information associated with attached robotic peripherals? How can the robotic system adapt to the attached robotic peripherals so the robot can effectively and safely use the attached robotic peripherals? Therefore, a need exists for robotic apparatus and methods that can be quickly and efficiently adapted to automate different types of production tasks. There is also growing interest in the ease-of-use of programmable robotic systems for novice end-users.

Various embodiments of the present disclosure include examples of a robotic apparatus that detachably yet rigidly connects one or more robotic peripherals to a robot in a repeatable manner, provides peripheral profile information associated with the robotic peripherals, and causes the robot to adaptively reconfigure based on the peripheral profile information. The robotic apparatus can utilize easy-to-install and/or hot-swappable robotic peripherals, such as sensors, end effectors, tooling, and other robotic peripherals. The robotic apparatus enables users of the robot to efficiently and intuitively retool the robot and adaptively automate the robot for different types of tasks, which decreases expenditure of resources such as time, effort, and expertise required for robotic automation, and thus enhancing the value and appeal of robotic automation for manufacturing enterprises of all sizes, particularly for SMEs that typically implement smaller-scale production processes.

Embodiments of the present disclosure relate to apparatus and methods for detachably connecting robotic peripherals to a robot, providing peripheral information associated with the robotic peripherals, and causing the robot to adaptively reconfigure based on the peripheral information. Specifically, an apparatus for adaptive robotic retooling comprises a peripheral adapter including a first side that has a peripheral flange, a second side for connecting the peripheral adapter to a robotic peripheral, a peripheral data storage unit for storing a peripheral profile of the robotic peripheral, and a peripheral communication device for communicating peripheral information in the peripheral profile, wherein the peripheral data storage unit and the peripheral communication device are communicatively linked; a robotic adapter including a first side that has a robotic flange, a second side for connecting the robotic adapter to a robot, and a robotic communication device for providing a communication link with the peripheral communication device; and a connector including a coupling mechanism for mechanically coupling the peripheral flange to the robotic flange, thereby forming a detachable connection between the peripheral adapter and the robotic adapter and causing the robotic adapter to query the peripheral adapter for the peripheral information via the communication link.

Additional objects and advantages of the embodiments of the disclosure will be set forth in part in the description which follows, and in part will be obvious from the description, or may be learned by practice of the embodiments. The objects and advantages of the embodiments will be realized and attained by means of the elements and combinations particularly pointed out in the appended claims. It is to be understood that both the foregoing general description and the following detailed description are exemplary and explanatory only and are not restrictive of the embodiments, as claimed.

DETAILED DESCRIPTION

Figure 1A:
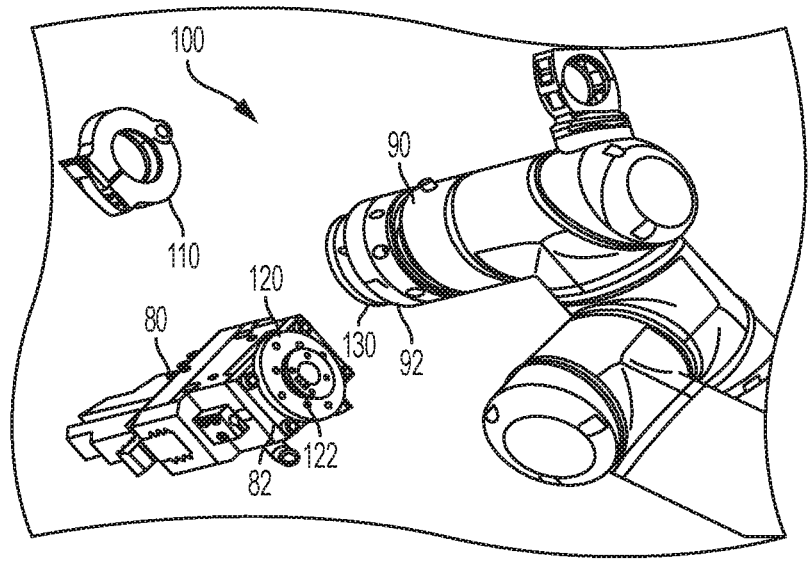
FIGS. 1A-C illustrate an embodiment of a robotic retooling apparatus for adaptively retooling a robot in a robotic system that detachably connects robotic peripherals to the robot and causes the robotic system to adaptively reconfigure the robot based on the detachably connected robotic peripherals, consistent with the principles of the present disclosure.

Reference will now be made in detail to example embodiments, which are illustrated in the accompanying drawings. When appropriate, the same reference numbers are used throughout the drawings to refer to the same or like parts.

For simplicity and illustrative purposes, the principles of the present disclosure are described by referring mainly to various embodiments thereof. However, one of ordinary skill in the art would readily recognize that the same principles are equally applicable to, and can be implemented in, all types of information and systems, and that any such variations do not depart from the true spirit and scope of the present disclosure. Moreover, in the following detailed description, references are made to the accompanying figures, which illustrate specific embodiments. Electrical, mechanical, logical and structural changes may be made to the various embodiments without departing from the spirit and scope of the present disclosure. The following detailed description is, therefore, not to be taken in a limiting sense and the scope of the present disclosure is defined by the appended claims and their equivalents.

In the present disclosure, the word "robot" will be used instead of robotic manipulator or robotic apparatus. Typically, a robot is an industrial robotic manipulator or a set of industrial robotic manipulators for automated or semi-automated production applications. An end effector can be a tool effector attached to a robot at a connection site of the robot or a tool grasped or held by a gripper-type end effector attached to the robot. The following general definitions will be used herein. Robotic hardware module: a physical device or tooling that can be connected (e.g., attached, coupled, linked, etc.) to a robot and/or disconnected (e.g., detached, decoupled, delinked, and the like) from the robot. Peripheral or robotic peripheral: a robotic hardware module that can be connected to a robot to provide some physical interaction, manipulation, and/or sensing capability. Active peripheral: a peripheral that can communicate with a robot via one or more communication channels such as a network connection, a Universal Serial Bus ("USB") connection, etc., and may or may not have a physical connection with the robot. Passive peripheral: a peripheral with only a mechanical connection to a robot. Software module: a unit of software that encapsulates some processing, algorithmic, or inference capability accessible via at least one defined interface. Software component: an instantiated software module. User interface ("UI"): a visual, gestural, haptic, or audio interface that allows for user interaction with a robot. UI component: a widget or graphical element that can accept input and events from a user and provide information to the user. Robotic system: an integrated, interconnected collection of at least one robot and one or more hardware and/or software modules/components that communicate with and control the robot, manage and store information associated with the robot, and/or interact with at least one user to configure and operate the robot. Detachable connection: a physical connection between a robotic hardware module and at least one other robotic hardware module discrete from the first module that can be formed and broken in a repeatable manner.

Large-scale manufacturing enterprises typically implement large-scale production processes and leverage production scale to amortize costs associated with robotic automation. Consequently, large-scale manufacturing enterprises can afford to invest in many robotic systems and specialize each robotic system to automate a limited set of production tasks, for example, by creating custom mounts for attaching robotic peripherals to the robotic system, writing custom drivers for the robotic system to control and interact with active or "smart" robotic peripherals or actuate passive or "dumb" robotic peripherals, and hard coding the robotic system with information about each robotic peripheral, such as its mass, shape, physical extent, attachment site or sites, and the like.

In contrast, small and medium-sized manufacturing enterprises ("SMEs") typically implement production processes at smaller scales, which limits SMEs' ability to amortize costs associated with robotic automation through production scale. Consequently, SMEs wanting to adopt robotic automation need to be able to amortize associated costs through other approaches, for example, by utilizing robotic systems that can be quickly and efficiently adapted to automate a wide range of production tasks. A robotic system that offers flexibility in programming, tooling, and user interactions can be adapted to automate different types of production tasks without requiring excessive expenditure of resources such as time, effort, and expertise.

Adaptive robotic retooling apparatus and methods, embodiments of which are described herein, solve several problems that are typical of outfitting a robot in a robotic system with different robotic peripherals (e.g., tools, sensors, end effectors, etc.) to allow the robot to successfully and safely perform actions with the robotic peripherals in the physical world. One, the robotic peripherals must be attached to the robot in a repeatable and rigid manner. This is required so that an attached robotic peripheral does not move or come loose while the robot performs actions with the attached robotic peripheral. Two, the physical properties of the attached robotic peripheral, such as its mass, center of mass, moment of inertia, shape, physical extent, interaction or grasping point, must be programmed into the robotic system. The size information is required so that interaction point of the attached robotic peripheral as well as its shape and extent can be factored into calculations for kinematic movement, collision detection, and other motion calculations. The mass information is used when the robot is equipped with a force sensor and must offset the mass of the attached robotic peripheral, or when the robot is placed into a compliant and gravity-compensated mode for teaching. Three, driver information must be retrieved and loaded into the robotic system to communicate with and operate the attached robotic peripheral. If the robotic peripheral attached to the robot includes an active peripheral, such as an electrically driven "smart" tool (e.g., a servo), a suitable driver must be loaded to provide proper power or electrical signals to the robotic peripheral. In this situation, the driver also communicates with the robotic peripheral and receives feedback from the robotic peripheral. If the robotic peripheral attached to the robot includes a passive peripheral, such as a pneumatically or hydraulically actuated "dumb" tool, a driver must be loaded that actuates a pneumatic or hydraulic cylinder to cause fluid flow or pressure change to operate the robotic peripheral.

To address the above-described problems, apparatus and methods for adaptive robotic retooling utilize a programmable peripheral adapter that can attach to the robotic peripheral, store and provide peripheral information associated with the robotic peripheral, detachably connect the robotic peripheral to the robot, and generate connection events that cause the robotic system to adaptively reconfigure the robot based on the peripheral information. The programmable peripheral adapter includes an embedded storage unit that stores the peripheral information, such as physical properties of the robotic peripheral, one or more drivers suitable for operating the robotic peripheral, UI requirements for configuring and/or interacting with the robotic peripheral, one or more images representative of the robotic peripheral, and the like. Physical properties of the robotic peripheral include, for example, a unique identifier, one or more names, one or more models, one or more types, a relative mounting offset, size, mass, a shape, physical extent, type and/or location of one or more attachment sites, and the like. The embedded storage unit can also store information associated with the programmable peripheral adapter itself, such as physical properties (e.g., a unique identifier, mass, center of mass, thickness, shape, physical extent, type and/or location of one or more attachment points, and the like) of the programmable peripheral adapter, one or more images representative of the peripheral adapter, and the like. When the programmable peripheral adapter is detachably connects the robotic peripheral to the robot, the programmable peripheral adapter can communicate with the robotic system and provide the robotic system with useful information, which the robotic system uses to reconfigure the robot, update operating characteristics of the robot, and/or communicate with and operate the robotic peripheral.

Figure 1B:
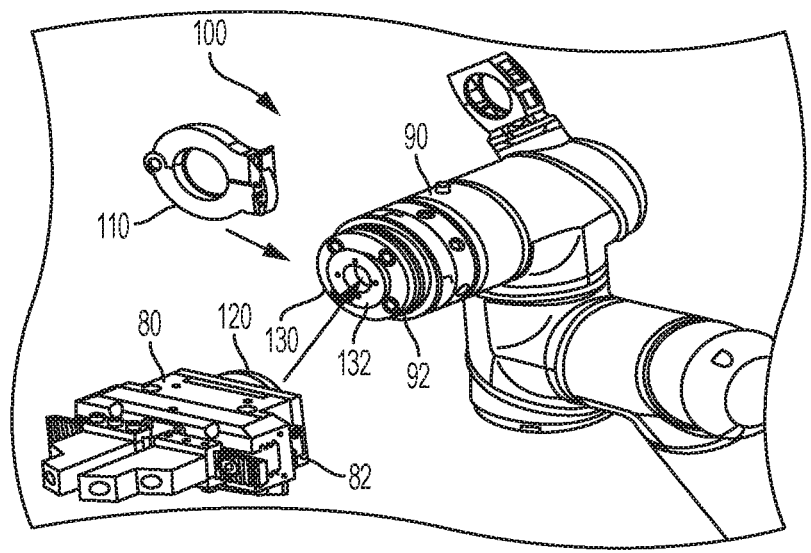
Figure 1C:
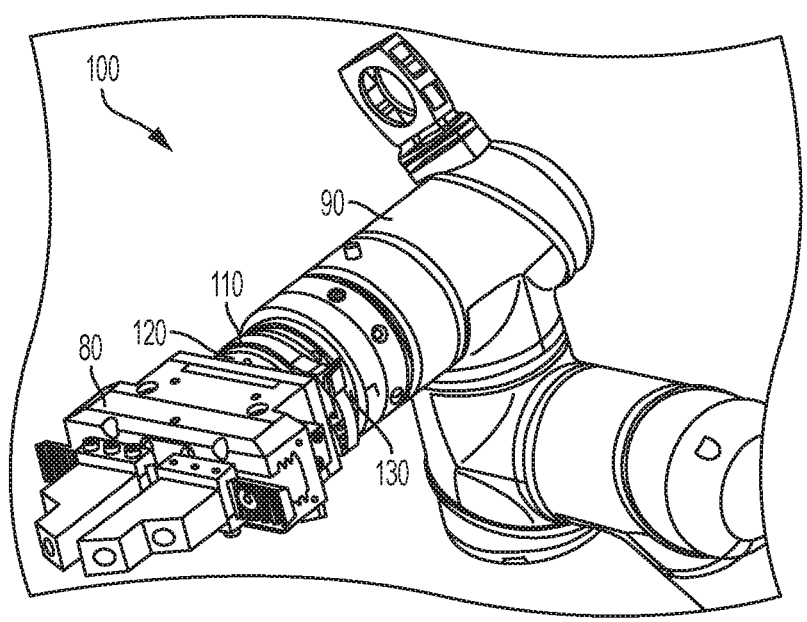

FIGS. 1A-C illustrate an embodiment of a robotic retooling apparatus 100 that detachably connects a robotic peripheral 80 to a robot 90 in a robotic system and causes the robotic system to adaptively reconfigure robot 90, consistent with the principles of the present disclosure. In various embodiments, an example of which is shown in FIGS. 1A-C, robotic retooling apparatus 100 includes a connector 110 that detachably connects a peripheral adapter 120 to a robotic adapter 130. Peripheral adapter 120 has at least two sides, including a flange side and a peripheral side. Robotic adapter 130 also has at least two sides, including a flange side and a robot side. Peripheral adapter 120 can attach to robotic peripheral 80 at the peripheral side of peripheral adapter 120, and robotic adapter 130 can attach to robot 90 at the robot side of robotic adapter 130. If peripheral adapter 120 and robotic adapter 130 are attached to robotic peripheral 80 and robot 90, respectively, then connector 110 can form a detachable connection between robotic peripheral 80 and robot 90. Robotic retooling apparatus 100 also includes a docking unit, which is described in greater detail below and with respect to FIGS. 4A and 4B, that programs peripheral adapter 120 with information associated with robotic peripheral 80.

Connector 110 detachably connects peripheral adapter 120 to robotic adapter 130, for example, by including a coupling mechanism that mechanically couples at least one peripheral flange 122 on the flange side of peripheral adapter 120 with at least one robotic flange 132 on the flange side of robotic adapter 130. The geometries of connector 110, peripheral flange 122, and robotic flange 132 are shaped such that, when connector 110 physically couples (e.g., envelopes, clasps, etc.) peripheral flange 122 and robotic flange 132 together, the coupling mechanism of connector 110 rigidly mates peripheral adapter 120 to robotic adapter 130. For example, the coupling mechanism of connector 110 can include a locking mechanism that locks peripheral adapter 120 and robotic adapter 130 together to fully constrain peripheral adapter 120 and robotic adapter 130 in both position and rotation relative to each other.

Connector 110 is shown in FIGS. 1A and 1B as a discrete mating collar separate from peripheral adapter 120 and robotic adapter 130. However, in various embodiments, connector 110 can an integral part of peripheral adapter 120 and/or robotic adapter 130, allowing peripheral adapter 120 and robotic adapter 130 to mechanically connect together without a discrete mating collar. The rotation of peripheral adapter 120 and robotic adapter 130 relative to one another is either constrained by connector 110 or by one or more alignment features on peripheral adapter 120 and robotic adapter 130, such as one or more alignment pins or complementarily shaped protrusions.

Peripheral adapter 120 attaches to robotic peripheral 80 at one or more attachment sites 82 of robotic peripheral 80. Peripheral adapter 120 can be programmed to store at least one peripheral profile containing information associated with robotic peripheral 80, such as a set of physical properties of robotic peripheral 80 (e.g., unique identifier, name, model, type, relative mounting offset, size, mass, shape, physical extent, type and/or location of attachment sites 82, etc.), one or more suitable drivers that the robotic system can run to operate robotic peripheral 80, UI requirements, one or more images representative of robotic peripheral 80, and the like.

Peripheral adapter 120 can also be programmed to store one or more adapter profiles containing information associated with robotic retooling apparatus 100 or components thereof, such as physical properties (e.g., unique identifier, name, mass, thickness, center of mass, relative mounting offset, shape, physical extent, type and/or location of attachment points, and the like) and one or more images representative of connector 110, peripheral adapter 120, and/or robotic adapter 130. As described in greater detail infra and with respect to FIGS. 4A and 4B, peripheral adapter 120 includes an embedded data storage unit and a communication device for storing and communicating information in the peripheral profile of robotic peripheral 80 and/or the adapter profiles of connector 110, peripheral adapter 120, and/or robotic adapter 130.

Robotic adapter 130 attaches to robot 90 at a connection site 92 of robot 90 and includes a communication device (not shown) that communicatively links with the communication device of peripheral adapter 120 via a physical connection (e.g., connectors, wired connections, spring contacts, etc.), a wireless connection (e.g., Bluetooth, near-field communication ("NFC"), WiFi, RF, optical, etc.), or other means, such as via detectable changes in one or more physical properties (e.g., capacitance, resistance, magnetic field, etc.). Robotic retooling apparatus 100 can detect one or more detachable connections forming between robotic peripheral 80 and robot 90, and in response, generate one or more connection events to notify the robotic system. With peripheral adapter 120 attached to robotic peripheral 80 and robotic adapter 130 attached to robot 90, robotic retooling apparatus 100 can generate the connection events to notify the robotic system of a detachable connection forming between robotic peripheral 80 and robot 90.

In various embodiments, robotic retooling apparatus 100 includes a connection monitor (not shown) that detects a formation of detachable connections between peripheral adapter 120 and robotic adapter 130, which causes robotic retooling apparatus 100 to respond by generating one or more connection events and establishing a communication link between peripheral adapter 120 and robotic adapter 130. Robotic retooling apparatus 100 can include the connection monitor as an integrated part of robotic adapter 130. Robotic retooling apparatus 100 can also integrate the connection monitor as a part of connector 110 and/or peripheral adapter 120 as well as utilize one or more sensors of robotic peripheral 80 or robot 90 as the connection monitor.

The connection monitor can include a mechanical sensor that senses when peripheral flange 122 and robotic flange 132 are mated and/or when connector 110 is installed to mechanically connect peripheral adapter 120 to robotic adapter 130. The connection monitor can include a contact sensor that senses a change in capacitance or resistance when peripheral adapter 120 is brought into physical contact with robotic adapter 130. If the communication devices of peripheral adapter 120 and robotic adapter 130 both utilize a wireless communication modality, examples of which includes NFC and Bluetooth, the connection monitor can include a proximity sensor that utilizes either one or both of the communication devices to sense when peripheral adapter 120 and robotic adapter 130 are in physical proximity (e.g., within a communication range) of each other. The connection monitor can include a force sensor that senses vibration- or acceleration-based force being applied to robotic peripheral 80 and/or robot 90 or a perceived change in mass of robot 90.

When the connection monitor detects a detachable connection forming between peripheral adapter 120 and robotic adapter 130, robotic retooling apparatus 100 generates at least one connection event and establishes a communication link between peripheral adapter 120 and robotic adapter 130. In response to the connection event, the robotic system and/or robotic retooling apparatus 100 can alert the user that the connection event has taken place via one or more interface modalities such as vibration, color, LED display, LED monitor or cellular notification, and the like. Subsequent to establishing the communication link, a tool manager (not shown) running on the robotic system or robotic retooling apparatus 100 queries peripheral adapter 120, which then obtains profile information in a stored peripheral profile of robotic peripheral 80 and provides the profile information to robot 90 and/or the robotic system. The profile information associated with robotic peripheral 80 includes physical properties of robotic peripheral 80, such as the mass, center of mass, moment of inertia, shape, physical extent, interaction or grasping point, or required drivers and any other pertinent information that enable robot 90 to use robotic peripheral 80. The tool manager can also query peripheral adapter 120 for profile information in one or more stored adapter profiles of connector 110, peripheral adapter 120, and/or robotic adapter 130. The profile information associated with components of robotic retooling apparatus 100 includes physical properties of connector 110, peripheral adapter 120, and/or robotic adapter 130, either individually or in combination when detachably connected. The tool manager then relays the profile information to robot 90 and/or the robotic system to change system settings, load drivers, actuate mechanical components, etc. If robot 90 is equipped with more than one robotic adapters, multiple connection events can be interpreted and handled at once for each robotic peripheral. In this manner, different robotic peripherals can be attached to robot 90 simultaneously, and are individually addressed by the tool manager.

The robotic system can include a peripheral manager (not shown) that monitors for connection events, and in response to one or more connection events, the peripheral manager communicates with peripheral adapter 120 and/or robotic adapter 130 to obtain relevant profile information in the peripheral profile of robotic peripheral 80 and/or the adapter profiles of the components of robotic retooling apparatus 100. Based on the profile information, the robotic system can reconfigure robot 90, load and execute at least one suitable peripheral driver for communicating with and operating robotic peripheral 80, dynamically generate and adapt UIs for users to interact with robotic peripheral 80 and/or robot 90, and the like. To reconfigure robot 90, robotic system can update at least one robotic profile of robot 90.

In various embodiments, the robotic system stores the robotic profile of robot 90 that specifies one or more properties, settings, and/or configurations of robot 90 and/or the robotic system. Robotic properties of robot 90 include mass-related information, inertia-related information, dynamics-related information, collision-related information, control gains-related information, simulation-related information, logical state-related information, kinematics-related information, connection site-related information, one or more images representative of robot 90, and the like. The robotic system can obtain the robotic properties associated with robot 90 from the robotic profile of robot 90, utilize the robotic properties to derive the robotic configuration of robot 90, and display the robotic configuration of robot 90. For example, the robotic system can obtain an image representative of robot 90 and information related to one or more connection sites (e.g., connection site 92) of robot 90, modify the image to indicate the connection sites' relative locations on robot 90, and display the modified image of robot 90 that visually indicates the relative locations of the connection sites of robot 90.

Figure 2:
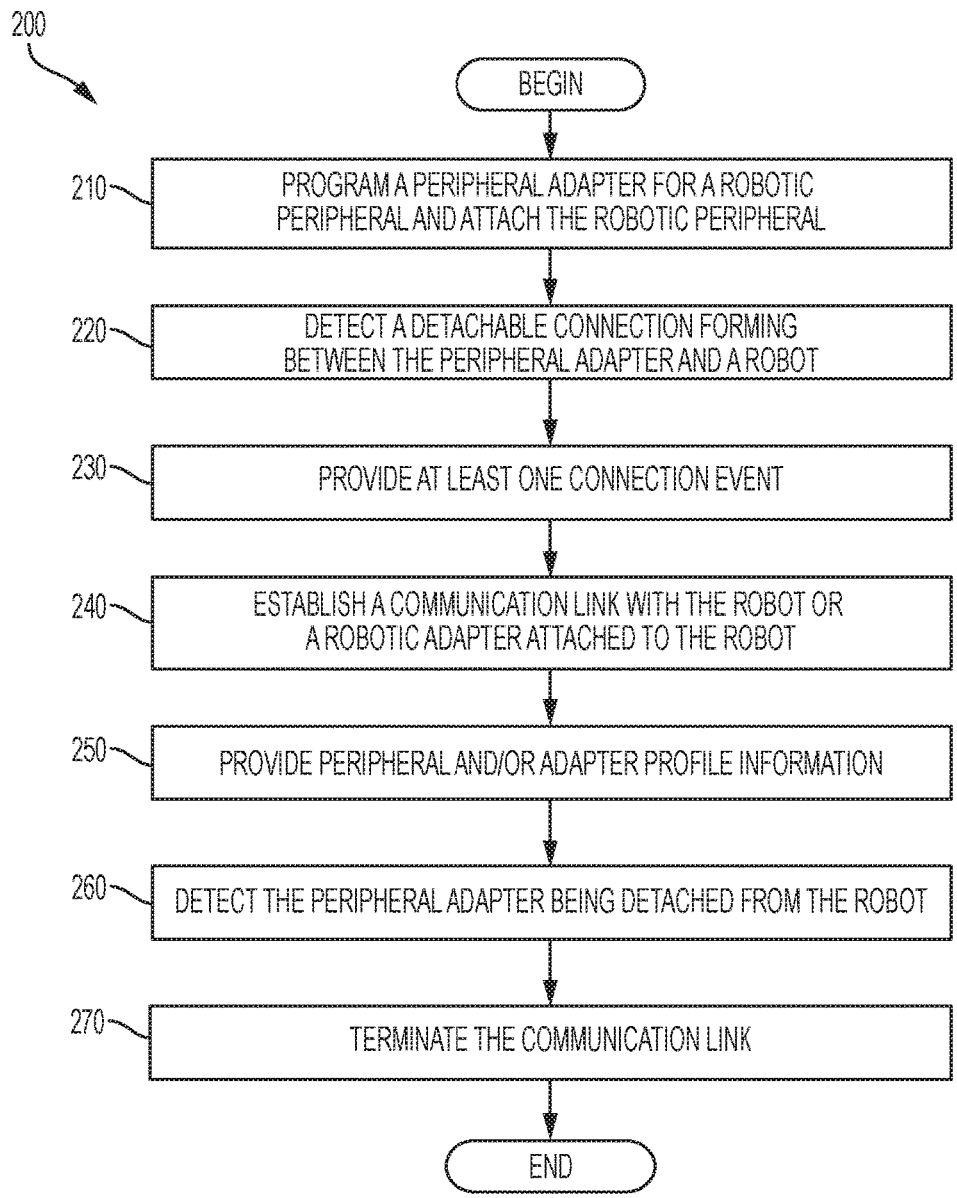
FIGS. 2 and 3 are flow diagrams illustrating examples of methods performed by the robotic retooling apparatus to adaptively retool the robot, consistent with embodiments of the present disclosure.

FIG. 2 illustrates an example process 200 for adaptive retooling of robots, consistent with embodiments of the present disclosure. More particularly, robotic retooling apparatus 100 performs process 200 to adaptively retool robots, an example of which includes robot 90 in the robotic system. Process 200 starts at stage 210, during which robotic retooling apparatus 100 identifies robotic peripheral 80 for which peripheral adapter 120 is designated, programs peripheral adapter 120 with at least one peripheral profile of robotic peripheral 80, and attach peripheral adapter 120 to robotic peripheral 80. Peripheral adapter 120 can be designated for robotic peripheral 80 based on user selection and/or properties of peripheral adapter 120, such as size, rigidity, relative mounting offset, type and location of attachment points relative to attachment sites of peripheral adapter 120, and the like. Robotic retooling apparatus 100 includes a docking unit for programming peripheral adapter 120, an example of the docking unit includes a docking unit 450 shown in FIGS. 4A and 4B and described in greater detail infra.

At stage 220, robotic retooling apparatus 100 detects a detachable connection forming between peripheral adapter 120 and robot 90, for example, via robotic adapter 130 attached to robot 90. Next, at stage 230, robotic retooling apparatus 100 generates at least one connection event, and then at stage 240, robotic retooling apparatus 100 establishes a communication link between robotic adapter 130 and the robotic system, either directly or relayed through robotic adapter 130.

At stage 250, robotic retooling apparatus 100 provides the peripheral profile of robotic peripheral 80 to the robotic system, which causes the robotic system to adaptively reconfigure robot 90 from an initial state based on peripheral information in the peripheral profile to a modified state, and thus accounting for robotic peripheral 80. Robotic retooling apparatus 100 can also provide adapter profiles of peripheral adapter 120, robotic adapter 130, and/or connector 110, which the robotic system to further reconfigure robot 90 based on adapter information in the adapter profiles.

At stage 260, robotic retooling apparatus 100 detects peripheral adapter 120 being detached from robot 90, i.e., the detachable connection between peripheral adapter 120 and robot 90 being broken. Finally, at stage 270, robotic retooling apparatus 100 terminates the communication link between peripheral adapter 120 and the robotic system.

Figure 3:
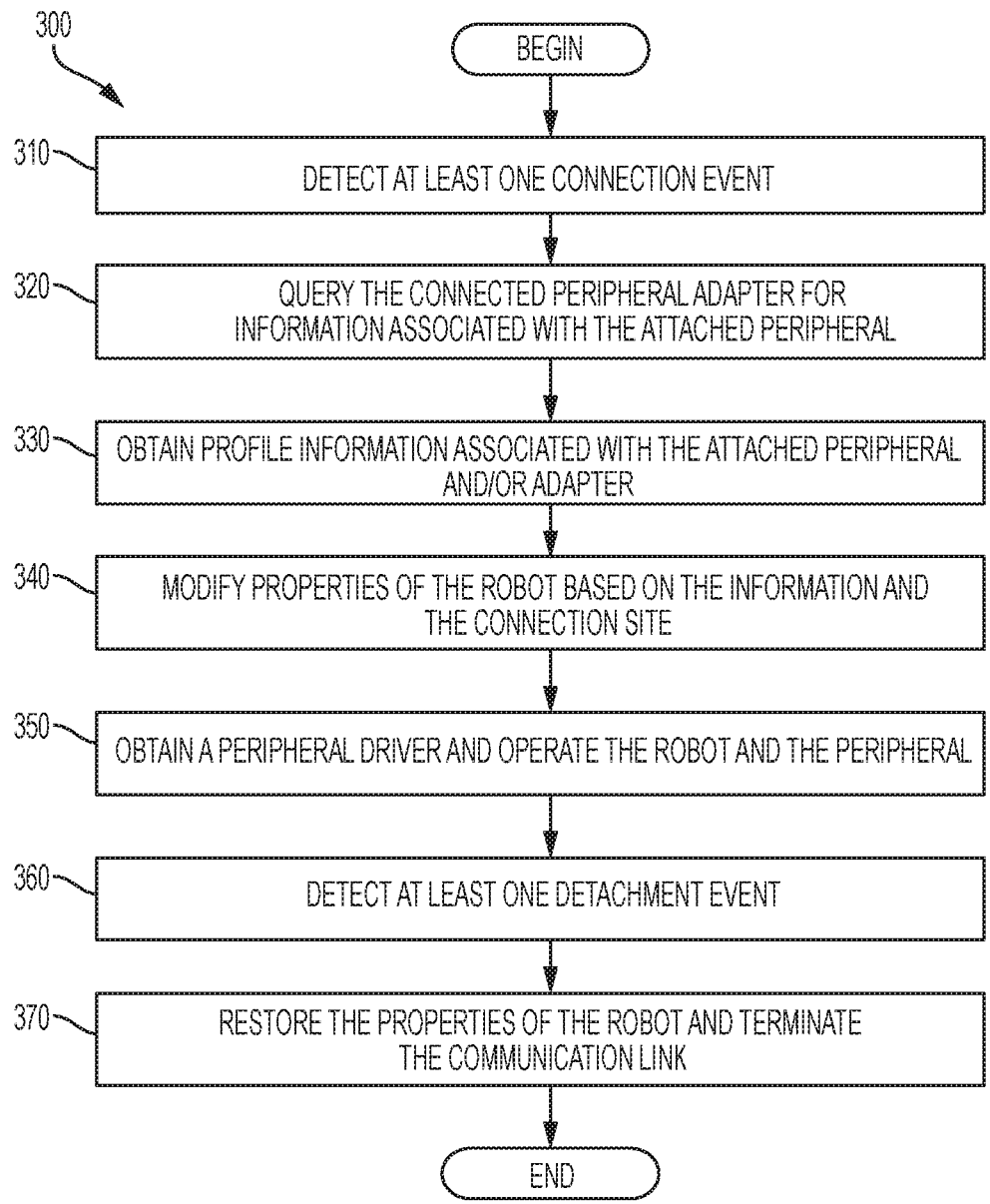

FIG. 3 illustrates an example process 300 for adaptive retooling of robots, consistent with embodiments of the present disclosure. More particularly, the robotic system performs process 300 to adaptively retool robots, an example of which includes robot 90 in the robotic system. Process 300 starts at stage 310, during which the robotic system detects at least one connection event generated by robotic retooling apparatus 100 and establishes a communication link with peripheral adapter 120. Next, at stage 320, the robotic system queries peripheral adapter 120 for peripheral information stored in the peripheral profile of robotic peripheral 80. The robotic system can also query peripheral adapter 120 for adapter information stored in adapter profiles of robotic adapter 130, peripheral adapter 120, and/or connector 110.

Then, at stage 330, the robotic system obtains the peripheral information and/or the adapter information, which the robotic system uses at stage 340 to adaptively reconfigure robot 90 from the initial state to the modified state, and thus accounting for robotic peripheral 80 and/or robotic adapter 130, peripheral adapter 120, and/or connector 110. Next, at stage 350, the robotic system obtains a suitable peripheral driver based on the peripheral information, with which the robotic system controls and operates robotic peripheral 90.

At stage 360, the robotic system receives at least one detachment event indicating that the detachable connection between peripheral adapter 120 and robot 90 is broken. Finally, at stage 370, the robotic system restores the robotic profile, including operating characteristics and properties of robot 90, to the initial state, and terminates the communication link between peripheral adapter 120 and the robotic system.

Figure 4A:
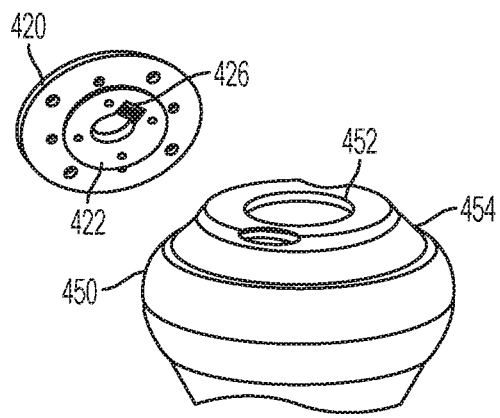
FIGS. 4A and 4B illustrate an embodiment of a peripheral adapter and a docking unit of the robotic retooling apparatus, consistent with the principles of the present disclosure.
Figure 4B:
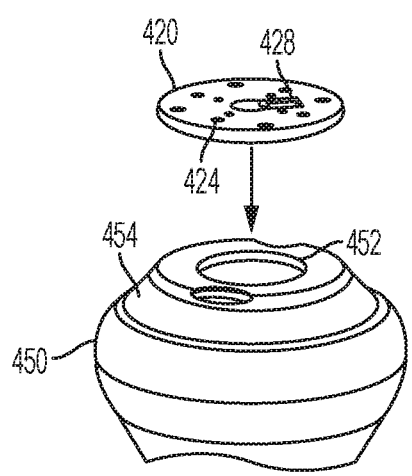

FIGS. 4A and 4B illustrate an embodiment of a peripheral adapter 420 (e.g., peripheral adapter 120 as shown in FIGS. 1A-C) and a docking unit 450 of a robotic retooling apparatus (e.g., robotic retooling apparatus 100), consistent with the principles of the present disclosure. In various embodiments, an example of which is shown in FIGS. 4A and 4B, peripheral adapter 420 has at least two sides, a peripheral flange 422 on one side, and one or more peripheral attachment sites 424 on a different side, at which peripheral adapter 420 can attach to a robotic peripheral (e.g., robotic peripheral 80) designated for peripheral adapter 420. Peripheral adapter 420 can attach to the robotic peripheral in a manner known to one skilled in the art, such as threaded fasteners, adhesives, welding, friction welding, pins, rivets, etc.

Peripheral adapter 420 includes a communication device 426, which is communicatively linked to a data storage unit 428 that is programmable to store a peripheral profile of the robotic peripheral designated for peripheral adapter 420. Communication device 426 matches the modality of a communication device in a robotic adapter (e.g., robotic adapter 130) and/or a robotic system, and communication device 426 can communicate with the robotic adapter and/or the robotic system via a physical connection (e.g., connectors, wired connections, spring contacts, etc.), a wireless connection (e.g., Bluetooth, NFC, WiFi, RF, optical, etc.), or other means, such as via detectable changes in one or more physical properties (e.g., capacitance, resistance, etc.). Data storage unit 428 includes a non-volatile, computer-readable storage medium mounted on a substrate (e.g., a circuit board) or embedded in the structure of peripheral adapter 420 in a protected fashion.

When peripheral adapter 420 is attached to the robotic peripheral and the robotic adapter is attached to a robot (e.g., robot 90) in the robotic system, a connector (e.g., connector 110) can detachably connect the robotic peripheral to the robot. When peripheral adapter 420 is detachably connected to the robot via the robotic adapter, peripheral flange 422 forms a physical connection to the robot via the connector and the robotic adapter, and communication device 426 in peripheral adapter 420 forms a communication link with the robotic system via the communication device in the robotic adapter or the robotic system.

In various embodiments, when peripheral adapter 420 is docked in docking unit 450, docking unit 450 programs peripheral adapter 420 with the peripheral profile of the robotic peripheral designated for peripheral adapter 420. Docking unit 450 includes a docking site 452 in which peripheral adapter 420 can dock, a status indicator 454 that provides status information associated with docking unit 450, and a communication device (not shown) that communicatively links with peripheral adapter 420. Docking unit 450 also includes a docking application (not shown) running on one or more computer processors in or connected to docking unit 450 that program peripheral adapter 420 with the peripheral information.

When peripheral adapter 420 is docked in docking unit 450, docking site 452 securely but detachably hosts peripheral adapter 420. For example, docking site 452 can be shaped to complement and/or accommodate the shape of peripheral flange 422, such that peripheral adapter 420 maintains a physical connection to docking unit 450 during docking. This connection need not be as robust as the physical connection formed between peripheral adapter 420 and the robotic adapter because during docking, peripheral adapter 420 is not subject to the robotic peripheral's operational forces and/or mass. Docking unit 450 includes a communication device (not shown) that communicates in the same modality as communication device 426 in peripheral adapter 420. When a user docks peripheral adapter 420 in docking unit 450, for example, by placing peripheral flange 422 in docking site 452, peripheral adapter 420 and/or docking unit 450 detects peripheral adapter 420 being docked in docking unit 450 and generates at least one docking event.

In response to the docking event, docking unit 450 establishes a communication link with communication device 426 in peripheral adapter 420 and notifies the user that the communication link has been established via a status indicator 454. For example, status indicator 454 can notify the user by displaying one or more colored lights or patterns, playing one or more musical notes or sound clips, providing one or more vibro-tactile alerts, generating one or more mechanical motions, and the like. Subsequent to establishing the communication link with peripheral adapter 420, docking unit 450 calls the docking application to query peripheral adapter 420 for the unique identifier of peripheral adapter 420. If peripheral adapter 420 does not have a unique identifier, for example, because peripheral adapter 420 is a new or blank adapter, then the docking application assigns a unique identifier to peripheral adapter 420. Otherwise, the docking application obtains the unique identifier assigned to peripheral adapter 420.

In response to the docking event, docking unit 450 also calls the docking application to program peripheral adapter 420 with the peripheral profile of the robotic peripheral designated for peripheral adapter 420. Prior to programming peripheral adapter 420, the docking application can provide one or more GUIs for the user to input, modify, and/or confirm the peripheral profile. Alternatively, the docking application can expedite the process of programming peripheral adapter 420 by automatically programming peripheral adapter 420 with one or more pre-stored peripheral profiles associated with one or more identical robotic peripherals, which would allow the user to efficiently program multiple peripheral adapters with one or more pre-stored peripheral profiles. In various embodiments, the docking application can individually address multiple docking units and use the docking units to simultaneously program multiple peripheral adapters, i.e., in parallel.

Figure 5:
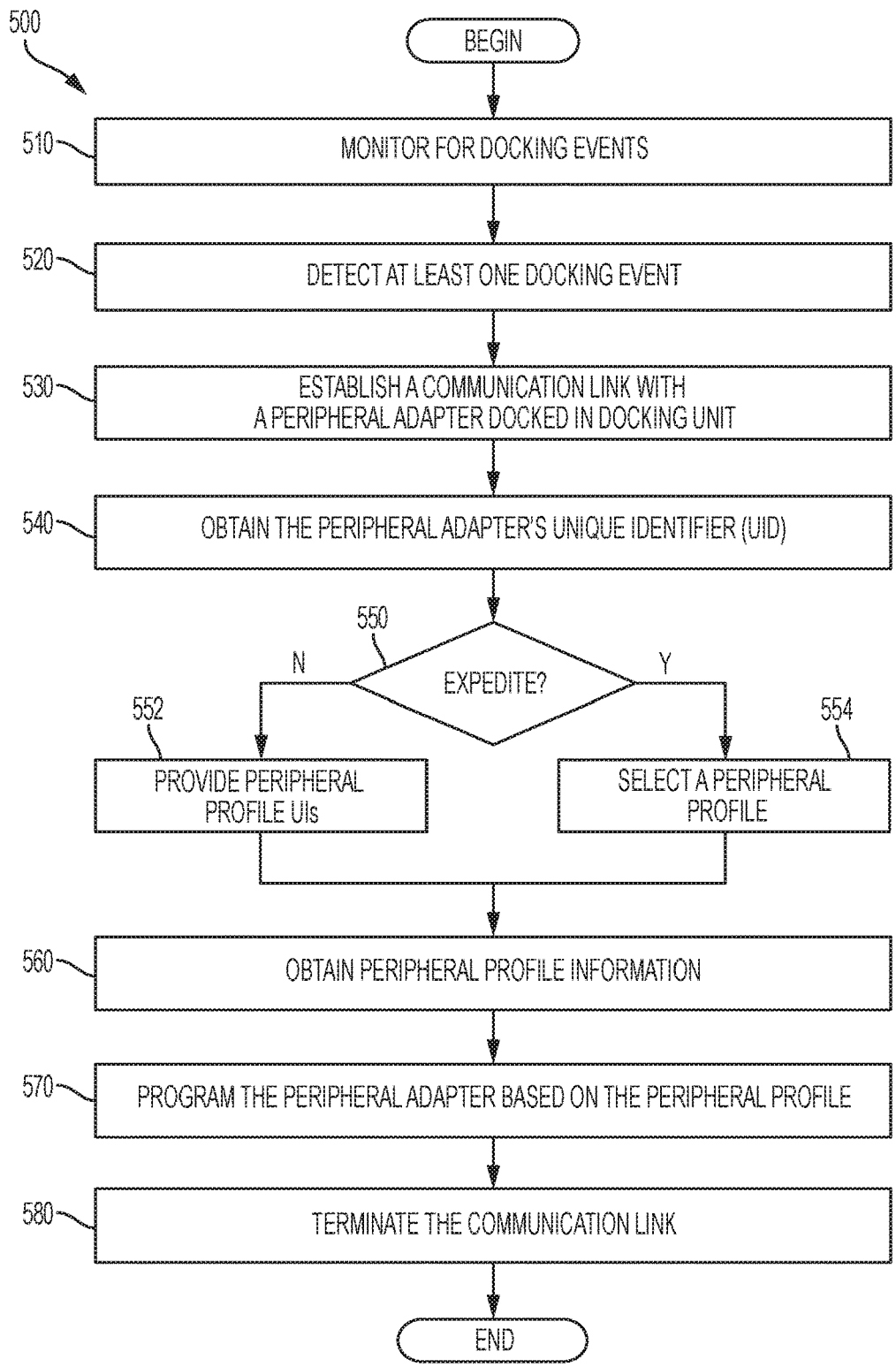
FIG. 5 is a flow diagram illustrating an example of a method performed by the docking unit to program peripheral adapters with peripheral profiles of robotic peripherals designated for the peripheral adapters, consistent with embodiments of the present disclosure.

FIG. 5 illustrates an example process for programming peripheral adapters with peripheral profiles of robotic peripherals designated for the peripheral adapters, consistent with embodiments of the present disclosure. Process 500 is performed in docking unit 450. It is desired that a robotic peripheral is attached to a robot in a robotic system. The robotic peripheral uses pneumatic pressure to actuate. The user takes a blank peripheral adapter (i.e., has no information stored in memory) and places it firmly in docking unit 450. This causes docking unit 450 to light up blue (visible through status indicator 454) and causes a tool loader software running on docking unit or an attached computer to initiate. The user uses the tool loader GUI to specify information about the robotic peripheral, such as its mass, inertia tensor, and other physical characteristics, as well as information about the driver needed to run the robotic peripheral (in this case a pneumatic system). The user then clicks a button, and this information is written to the peripheral adapter. This write can be rewritable or permanent. A security checksum is used to validate the data on the peripheral adapter, and a security key is provided.

The peripheral adapter is now removed from docking unit 450 and affixed to robotic peripheral in some manner. At some later time, the assembly of the robotic peripheral and the programmed peripheral adapter are placed against a robotic adapter attached to the robot, and a connector is used to mate or connect the two together. In response, a connection event is inferred and the robotic system obtains peripheral profile data stored on the peripheral adapter, changes the parameters of the robot according to the physical parameters and other profile information associated with the robotic peripheral, and loads the pneumatic driver. At this time, the user interface on the robot system is changed to denote that the robotic peripheral has been connected, and new interaction options are available for using or programming actions of the robotic peripheral. If the assembly of the robotic peripheral and the peripheral adapter is removed by removing the connector, another robotic peripheral can be attached and information can be read from it as well. Detaching the robotic peripheral can clear the parameters and drivers associated with the robotic peripheral.

Figure 6:
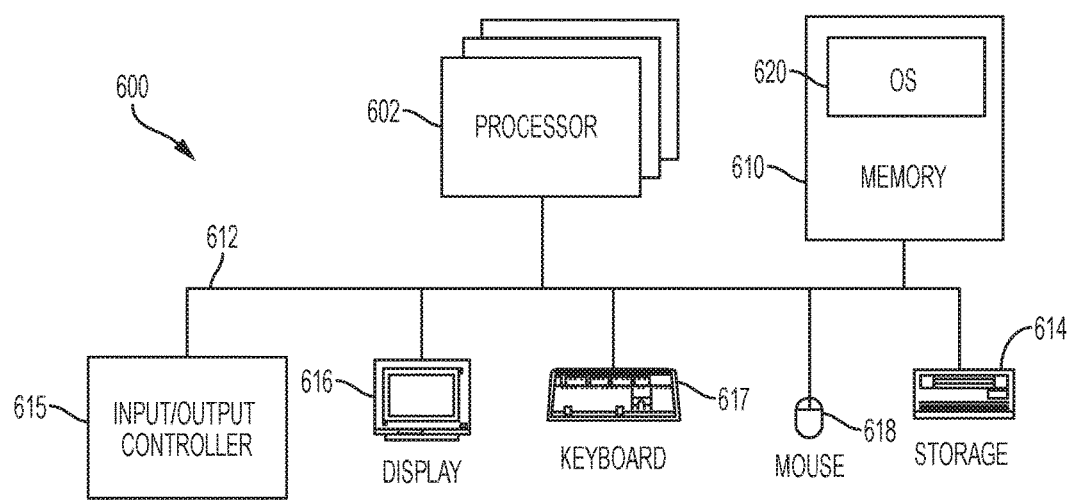
FIG. 6 is an example computer system for performing the disclosed embodiments, consistent with the present disclosure.

FIG. 6 illustrates a computer system 600 that is consistent with embodiments of the present disclosure. In general, embodiments of apparatus and methods for detachably connecting robotic peripherals to adaptively retool robots may be implemented in or performed by various computer systems, such as one or more personal computers, servers, workstations, embedded systems, multifunction devices, or a combination thereof. Certain embodiments of the systems or modules therein may be embedded as a computer program. The computer program may exist in a variety of forms both active and inactive. For example, the computer program can exist as software program(s) comprised of program instructions in source code, object code, executable code or other formats; firmware program(s); or hardware description language ("HDL") files. Any of the above can be embodied on a computer readable medium, which include storage devices and signals, in compressed or uncompressed form. However, for purposes of explanation, system 600 is shown as a general purpose computer that is well known to those skilled in the art. Examples of the components and peripherals that may be included in system 600 will now be described.

As shown, system 600 may include at least one processor 602, a keyboard 617, a pointing device 618 (e.g., a mouse, a 3-D pointing device, a touchpad, and the like), a display 616, main memory 610, an input/output controller 615, and a storage device 614. Storage device 614 can comprise, for example, RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. A copy of the computer program embodiment of the printer driver can be stored on, for example, storage device 614. System 600 may also be provided with additional input/output devices, such as a printer (not shown). The various components of system 600 communicate through a system bus 612 or similar architecture. In addition, system 600 may include an operating system ("OS") 620 that resides in memory 610 during operation. One skilled in the art will recognize that system 600 may include multiple processors 602. For example, system 600 may include multiple copies of the same processor. Alternatively, system 600 may include a heterogeneous mix of various types of processors. For example, system 600 may use one processor as a primary processor and other processors as co-processors. For another example, system 600 may include one or more multi-core processors and one or more single core processors. Thus, system 600 may include any number of execution cores across a set of processors (e.g., processor 602). As to keyboard 617, pointing device 618, and display 616, these components may be implemented using components that are well known to those skilled in the art. One skilled in the art will also recognize that other components and peripherals may be included in system 600.

Main memory 610 serves as a primary storage area of system 600 and holds data that is actively used by applications, such as the attachment manager in the robotic programming platform, running on processor 602. One skilled in the art will recognize that applications are software programs that each contains a set of computer instructions for instructing system 600 to perform a set of specific tasks during runtime, and that the term "applications" may be used interchangeably with application software, application programs, device drivers, and/or programs in accordance with embodiments of the present teachings. Memory 610 may be implemented as a random access memory or other forms of memory as described below, which are well known to those skilled in the art.

OS 620 is an integrated collection of routines and instructions that are responsible for the direct control and management of hardware in system 600 and system operations. Additionally, OS 620 provides a foundation upon which to run application software and device drivers. For example, OS 620 may perform services, such as resource allocation, scheduling, input/output control, and memory management. OS 620 may be predominantly software, but may also contain partial or complete hardware implementations and firmware. Well known examples of operating systems that are consistent with the principles of the present teachings include ROBOT OPERATING SYSTEM, LINUX, UNIX, ORACLE SOLARIS, MICROSOFT WINDOWS, MAC OS, OPEN VMS, and IBM AIX.

The foregoing description is illustrative, and variations in configuration and implementation may occur to persons skilled in the art. For instance, the various illustrative logics, logical blocks, modules, and circuits described in connection with the embodiments disclosed herein may be implemented or performed with a general purpose processor (e.g., processor 602), an application specific integrated circuit, a field programmable gate array or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a microprocessor, a plurality of microprocessors, or any other such configuration.

In various embodiments, the functions described may be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

If implemented in software, the functions may be stored on or transmitted over a computer-readable medium as one or more instructions or code. Computer-readable media includes both tangible, non-transitory computer storage media and communication media including any medium that facilitates transfer of a computer program from one place to another. A storage media may be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

Resources described as singular or integrated can in one embodiment be plural or distributed, and resources described as multiple or distributed can in embodiments be combined. The scope of the present teachings is accordingly intended to be limited only by the following claims. Although the invention has been described with respect to specific embodiments, those skilled in the art will recognize that numerous modifications are possible. For instance, the proxy servers can have additional functionalities not mentioned herein. In addition, embodiments of the present disclosure can be realized using any combination of dedicated components and/or programmable processors and/or other programmable devices. While the embodiments described above can make reference to specific hardware and software components, those skilled in the art will appreciate that different combinations of hardware and/or software components can also be used and that particular operations described as being implemented in hardware might also be implemented in software or vice versa.

What is claimed is:

1. An apparatus for adaptive robotic retooling, comprising:
   a peripheral adapter including a first side that comprises a peripheral flange, a second side for connecting the peripheral adapter to a robotic peripheral, a peripheral data storage unit for storing a peripheral profile of the robotic peripheral, and a peripheral communication device for communicating peripheral information in the peripheral profile, wherein the peripheral data storage unit and the peripheral communication device are communicatively linked;
   a robotic adapter including a first side that comprises a robotic flange, a second side for connecting the robotic adapter to a robot, and a robotic communication device for providing a communication link with the peripheral communication device;
   a connector including a coupling mechanism for mechanically coupling the peripheral flange to the robotic flange, thereby forming a detachable connection between the peripheral adapter and the robotic adapter and causing the robotic adapter to query, via the communication link, the peripheral adapter for the peripheral information; and
   a connection monitor for detecting a formation of the detachable connection between the peripheral adapter and the robotic adapter and generating, in response to detecting the formation of the detachable connection, a connection event,
   wherein the connection monitor includes at least one of a contact sensor for detecting the peripheral adapter being in physical contact with the robotic adapter, a proximity sensor for detecting the peripheral adapter being within a physical distance of the robotic adapter, or a force sensor for detecting one or more forces being applied to the robotic adapter.

2. The apparatus of claim 1, wherein the robotic adapter includes the connection monitor.

3. The apparatus of claim 1, wherein the peripheral adapter and the robotic adapter establish, in response to the connection event, the communication link between the robotic communication device and the peripheral communication device.

4. The apparatus of claim 3, wherein the peripheral data storage unit stores a unique identifier of the peripheral adapter, and wherein the robotic communication device of the robotic adapter establishes the communication link based on the unique identifier of the peripheral adapter.

5. The apparatus of claim 1, wherein the robotic adapter provides, in response to the connection event, the peripheral information to a robotic system that includes the robot, and wherein the robotic system modifies one or more robotic properties of the robot based on the peripheral information.

6. The apparatus of claim 5, wherein the one or more properties of the robot include at least one of mass-related information, inertia-related information, dynamics-related information, collision-related information, control gains-related information, simulation-related information, logical state-related information, kinematics-related information, connection site-related information, or one or more images representative of the robot.

7. The apparatus of claim 5, wherein the peripheral profile comprises one or more properties of the robotic peripheral including at least one of mass, center of mass, moment of inertia, shape, physical extent, or interaction point.

8. The apparatus of claim 5, wherein the peripheral profile comprises one or more drivers suitable for operating the robotic peripheral.

9. The apparatus of claim 5, wherein the robotic adapter provides, in response to the connection event, adapter properties associated with the peripheral adapter to the robotic system, and wherein the robotic system modifies the one or more robotic properties of the robot based on the adapter properties, the adapter properties of the peripheral adapter including at least one of a mass, center of mass, relative mounting offset, moment of inertia, shape, physical extent, or attachment site to the robotic peripheral.

10. The apparatus of claim 1, further comprising:
a docking unit including a docking monitor for detecting a formation of a docking connection between the peripheral adapter and a dock communication device for providing a communication link with the peripheral communication device of the peripheral adapter, wherein the docking unit obtains a current peripheral profile of the robotic peripheral and causes the peripheral adapter to store the current peripheral profile in the peripheral data storage unit.

11. The apparatus of claim 10, wherein the docking unit detects that the peripheral adapter lacks a unique identifier, generates a new unique identifier for the peripheral adapter, and assigns the new unique identifier to the peripheral adapter, thereby causing the peripheral adapter to store the new unique identifier.

12. The apparatus of claim 1, further comprising:
a plurality of docking units for docking a plurality of peripheral adapters, obtaining one or more peripheral profiles of robotic peripherals that are each designated for at least one of the plurality of peripheral adapters, and simultaneously programming the plurality of peripheral adapters each with a respective one of the one or more peripheral profiles.

13. The apparatus of claim 1, wherein the connector includes a locking mechanism for rigidly mating the peripheral flange to the robotic flange, thereby causing the detachable connection to lock the peripheral adapter in position and rotation relative to the robotic adapter.

14. The apparatus of claim 1, wherein the connector is a discrete mating collar separate from the peripheral adapter and the robotic adapter.

15. The apparatus of claim 1, wherein the connector is an integral part of at least one of the peripheral adapter or the robotic adapter.

16. The apparatus of claim 1, wherein the peripheral communication device and the robotic communication device communicate via a communication modality that includes at least one of a wired connection, a wireless connection, change in resistance, or change in capacitance.

17. An apparatus for adaptive robotic retooling, comprising:
a peripheral adapter including a first side that comprises a peripheral flange, a second side for connecting the peripheral adapter to a robotic peripheral, a peripheral data storage unit for storing a peripheral profile of the robotic peripheral, and a peripheral communication device for communicating peripheral information in the peripheral profile, wherein the peripheral data storage unit and the peripheral communication device are communicatively linked;
a robotic adapter including a first side that comprises a robotic flange, a second side for connecting the robotic adapter to a robot, and a robotic communication device for providing a communication link with the peripheral communication device;
a connector including a coupling mechanism for mechanically coupling the peripheral flange to the robotic flange, thereby forming a detachable connection between the peripheral adapter and the robotic adapter and causing the robotic adapter to query, via the communication link, the peripheral adapter for the peripheral information; and
a docking unit including a docking monitor for detecting a formation of a docking connection between the peripheral adapter and a dock communication device for providing a communication link with the peripheral communication device of the peripheral adapter, wherein the docking unit obtains a current peripheral profile of the robotic peripheral and causes the peripheral adapter to store the current peripheral profile in the peripheral data storage unit,
wherein the docking unit detects that the peripheral adapter lacks a unique identifier, generates a new unique identifier for the peripheral adapter, and assigns the new unique identifier to the peripheral adapter, thereby causing the peripheral adapter to store the new unique identifier.

18. An apparatus for adaptive robotic retooling, comprising:
a peripheral adapter including a first side that comprises a peripheral flange, a second side for connecting the peripheral adapter to a robotic peripheral, a peripheral data storage unit for storing a peripheral profile of the robotic peripheral, and a peripheral communication device for communicating peripheral information in the peripheral profile, wherein the peripheral data storage unit and the peripheral communication device are communicatively linked;
a robotic adapter including a first side that comprises a robotic flange, a second side for connecting the robotic adapter to a robot, and a robotic communication device for providing a communication link with the peripheral communication device;
a connector including a coupling mechanism for mechanically coupling the peripheral flange to the robotic flange, thereby forming a detachable connection between the peripheral adapter and the robotic adapter and causing the robotic adapter to query, via the communication link, the peripheral adapter for the peripheral information; and a plurality of docking units for docking a plurality of peripheral adapters, obtaining one or more peripheral profiles of robotic peripherals that are each designated for at least one of the plurality of peripheral adapters, and simultaneously programming the plurality of peripheral adapters each with a respective one of the one or more peripheral profiles.

* * * * *